3,020,280
QUINOLINE SYNTHESIS

Francis E. Cislak and William R. Wheeler, Indianapolis, Ind., assignors to Reilly Tar & Chemical Corporation, Indianapolis, Ind., a corporation of Indiana
No Drawing. Filed July 22, 1957, Ser. No. 673,121
3 Claims. (Cl. 260—283)

This invention relates to a process of preparing quinoline. More specifically, it relates to a process of preparing quinoline by the interaction of acetaldehyde, methanol, and aniline.

The quinoline of commerce is isolated from coal tar distillates. The amount that can be produced in this manner is limited. A classical method of synthesizing quinoline is the Skraup synthesis. The Skraup procedure involves an interaction of aniline with glycerine, sulfuric acid, and an oxidizing agent. The main drawback to the Skraup method is tnat it does not readily lend itself to continuous operation.

We have found that we can prepare quinoline in a continuous manner by the interaction of acetylene or acetaldehyde with methanol and aniline.

In carrying out our invention, we prepare a mixture of acetaldehyde and methanol. This acetaldehyde-methanol solution is then vaporized, mixed with vaporized aniline, and the resultant mixture is passed through a suitable reactor containing a catalyst. The temperature of the reactor is maintained between about 400° C. and 550° C. and preferably between about 450° C. and 500° C. We prefer to conduct our process in a continuous manner although that is not necessary.

The reactor used may be of various types. We prefer the fluid catalyst type, similar to those normally used in carrying out cracking operations in the petroleum industry. Such reactors are of tubular form with suitable connections at entrance and exit. They are provided with means for supporting the fluid bed of catalyst, and are provided with any convenient means for heating them.

The catalyst used may be any of a large number of catalysts which are useful in the preparation of 2-picoline and 4-picoline from acetylene and ammonia.

Illustrative of the manner in which our invention may be carried out, we cite the following example. The parts are by weight.

Example 1

To 41 parts of acetaldehyde we add 28 parts of methanol. The resulting acetaldehyde-methanol solution is vaporized, mixed with aniline vapors to prepare a gaseous mixture composed of about equal parts of acetaldehyde-methanol solution and of aniline. We pass the mixture of vapors through a fluid catalyst type reactor containing a fluidized catalytic bed of silica-alumina catalyst (13% alumina). The temperature of the reactor is maintained at about 450° C. As the vapors of aniline, acetaldehyde, and methanol pass through the reactor, a reaction occurs whereby quinoline is formed. The vapors of the unchanged reactants and the reaction products are condensed as they emerge from the reactor, and the condensate is collected in a suitable receiver. The condensate as recovered contains water. This water may be removed by the addition of flake caustic soda. The resulting dry crude bases are fractionally distilled through an efficient fractionation column.

Instead of acetaldehyde, we may use acetylene. If we use acetylene in the process of Example 1, we prepare a gaseous mixture of acetylene, methanol, and aniline and pass the resultant mixture through our reactor.

In place of the silica-alumina catalyst, we may use a large number of other catalysts. In general, we find that among the catalysts useful in carrying out our reaction are those catalysts which have been found useful in the preparation of 2-picoline and 4-picoline from acetylene (or acetaldehyde) and ammonia. Such catalysts include, in addition to the silica-alumina catalyst of Example 1, alumina, silica, silica-magnesia, fuller's earth, pumice, zinc chloride, zinc fluoride, cadmium chromate, cadmium fluoride, zinc phosphate, and the like.

Our invention does not reside in the discovery of a new catalyst. What we have discovered is that the interaction of acetaldehyde, or acetylene, methanol, and aniline yields quinoline of high purity and in commercially acceptable yields.

In Example 1 the molecular equivalents of the reactants are approximately as follows: aniline, one mol; acetaldehyde, 0.75 mol; methanol, 0.75 mol. We need not, however, use the specific molal ratios of Example 1. The proportions of the reactants may vary widely. In general, we prefer to use an excess of aniline although that is not necessary.

The temperature at which our reaction may be conducted may be varied widely. In general, we prefer to have the reaction temperatures above about 400° C. and below about 550° C. It has been our experience that at temperatures below about 400° C., too large a proportion of the reactants pass through without reacting. At temperatures above about 550° C., we find our catalyst becomes inactivated rapidly and we obtain too many side reactions.

We claim as our invention:

1. The process of preparing quinoline which comprises mixing the vapors of acetaldehyde, methanol, and aniline, passing the resultant mixture through a reactor containing a silica-alumina catalyst maintained at a temperature between about 450° C. to about 500° C. and recovering quinoline from the reaction product.

2. The process of preparing quinoline which comprises mixing the vapors of acetaldehyde, methanol, and aniline, passing the resultant mixture through a reactor containing an alumina catalyst maintained at a temperature between about 450° C. to about 500° C. and recovering quinoline from the reaction product.

3. The process of preparing quinoline which comprises mixing the vapors of acetaldehyde, methanol, and aniline, passing the resultant mixture through a reactor containing a zinc fluoride catalyst maintained at a temperature between about 450° C. to about 500° C. and recovering quinoline from the reaction product.

References Cited in the file of this patent

Elderfield: Heterocyclic Compounds, vol. IV, pp. 10 and 11, John Wiley, New York, N.Y., 1952.